(12) United States Patent
Vik

(10) Patent No.: US 10,737,721 B2
(45) Date of Patent: Aug. 11, 2020

(54) STEERABLE DRIVE AXLE FOR A TRACKED WORK VEHICLE

(71) Applicant: CNH Industrial America, LLC, New Holland, PA (US)

(72) Inventor: Brian Vik, Barnesville, MN (US)

(73) Assignee: CNH Industrial America LLC, New Holland, PA (US)

( * ) Notice: Subject to any disclaimer, the term of this patent is extended or adjusted under 35 U.S.C. 154(b) by 23 days.

(21) Appl. No.: 15/336,084

(22) Filed: Oct. 27, 2016

(65) Prior Publication Data

US 2018/0118262 A1 May 3, 2018

(51) Int. Cl.

| | |
|---|---|
| *B62D 11/20* | (2006.01) |
| *B62D 55/06* | (2006.01) |
| *B62D 55/10* | (2006.01) |
| *B62D 55/12* | (2006.01) |
| *F16H 1/28* | (2006.01) |
| *B62D 55/065* | (2006.01) |
| *B62D 55/084* | (2006.01) |
| *B62D 55/125* | (2006.01) |

(52) U.S. Cl.
CPC ............ *B62D 11/20* (2013.01); *B62D 55/065* (2013.01); *B62D 55/084* (2013.01); *B62D 55/10* (2013.01); *B62D 55/125* (2013.01); *F16H 1/28* (2013.01)

(58) Field of Classification Search
CPC ........ B62D 11/20; B62D 55/06; B62D 55/10; B62D 55/12; B62D 55/065
See application file for complete search history.

(56) References Cited

U.S. PATENT DOCUMENTS

| | | | |
|---|---|---|---|
| 2,845,818 A | 8/1958 | Siljander | |
| 4,560,018 A | 12/1985 | Satzler | |
| 6,176,334 B1 * | 1/2001 | Lorenzen | B62D 21/14 180/9.46 |
| 6,547,685 B2 | 4/2003 | Kawada et al. | |
| 6,830,530 B2 | 12/2004 | Perkins et al. | |
| 7,503,416 B2 | 3/2009 | Sharma et al. | |
| 8,007,058 B2 | 8/2011 | Bessette | |
| 8,430,188 B2 | 4/2013 | Hansen | |
| 8,662,214 B2 * | 3/2014 | Zuchoski | B62D 55/10 180/9.25 |
| 8,678,968 B2 | 3/2014 | Troennberg et al. | |

(Continued)

*Primary Examiner* — Tony H Winner
(74) *Attorney, Agent, or Firm* — Rickard K. DeMille; Rebecca L. Henkel

(57) ABSTRACT

A steerable drive axle for a tracked work vehicle may generally include an axle body extending lengthwise between first and second ends and an axle support assembly pivotally coupled to one of the first end or the second end of the axle body. The axle support assembly may include an inboard support member configured to extend at least partially along an inboard side of a drive wheel of the tracked work vehicle, an outboard support member configured to extend at least partially along an outboard side of the drive wheel, and a non-rotating planetary carrier extending lengthwise between an inboard end and an outboard end. The inboard end may be coupled to the inboard support member and the outboard end may be coupled to the outboard support member. Additionally, the non-rotating planetary carrier may be configured to support a plurality of planetary gears between the inboard and outboard ends.

18 Claims, 10 Drawing Sheets

(56) References Cited

U.S. PATENT DOCUMENTS

| | | | |
|---|---|---|---|
| 8,801,115 B2* | 8/2014 | Hansen | B62D 55/04 |
| | | | 180/9.21 |
| 8,967,736 B2* | 3/2015 | Zakuskin | B62D 55/125 |
| | | | 180/65.6 |
| 9,096,264 B2 | 8/2015 | Connors et al. | |
| 9,273,446 B2* | 3/2016 | Manchester | E02F 5/109 |
| 9,505,454 B1* | 11/2016 | Kautsch | B62D 55/104 |
| 9,868,462 B2* | 1/2018 | Mannering | B62D 11/20 |
| 2013/0158802 A1 | 6/2013 | Miller et al. | |
| 2014/0261063 A1 | 9/2014 | Roudiere et al. | |

* cited by examiner

STEERABLE DRIVE AXLE FOR A TRACKED WORK VEHICLE

FIELD OF THE INVENTION

The present subject matter relates generally to work vehicles and, more particularly, to a steerable drive axle having a non-rotating planetary carrier and supporting structure that eliminates cantilevered loading on the gear assembly and other associated components.

BACKGROUND OF THE INVENTION

Current work vehicles, such as tractors and other agricultural vehicles, include an electronically controlled engine and a transmission, such as a power shift transmission (PST) or a continuously variable transmission (CVT), coupled to the engine. The transmission is, in turn, coupled to at least one drive axle for transferring torque from the transmission to the vehicle's wheels or tracks. For instance, for a four-wheel drive track-driven vehicle, a drive wheel of each front track assembly is typically rotationally coupled to a front drive axle of the work vehicle for transferring torque transmitted from the engine to the front track assemblies while a drive wheel of each rear track assembly is typically rotationally coupled to a rear drive axle of the work vehicle for transferring torque transmitted from the engine to the rear track assemblies. As is generally understood, each drive wheel may be configured to rotationally engage a corresponding endless track of the associated track assembly such that rotation of the drive wheel rotates the track, thereby allowing the vehicle to be driven forward or backward.

In many instances, it is desirable to provide a tracked work vehicle that includes a steerable drive axle to allow the track assemblies to be steered or pivoted relative to a central axle carrier or body of the drive axle. However, conventional steerable drive axles typically include a cantilevered arrangement outboard of the king pins, thereby resulting in a cantilevered load being applied through the associated gear assembly. As such, the components of the gear assembly, such as the planetary gears, bearings and/or other related components, must be overdesigned to accommodate the cantilevered loading condition, which significantly increases the overall weight and associated costs of the assembly.

Accordingly, a steerable drive axle for a tracked work vehicle having a configuration that eliminates cantilevered loading on the gear assembly and other associated components would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a steerable drive axle for a tracked work vehicle, wherein the work vehicle comprises a track assembly including a track and a drive wheel configured to rotationally drive the track. The drive axle may generally include an axle body extending lengthwise between a first end and a second end and an axle support assembly pivotally coupled to one of the first end or the second end of the axle body. The axle support assembly may include an inboard support member configured to extend at least partially along an inboard side of the drive wheel, an outboard support member configured to extend at least partially along an outboard side of the drive wheel, and a non-rotating planetary carrier extending lengthwise between an inboard end and an outboard end. The inboard end may be coupled to the inboard support member and the outboard end may be coupled to the outboard support member. Additionally, the non-rotating planetary carrier may be configured to support a plurality of planetary gears between the inboard and outboard ends. Moreover, when rotational motion is being transmitted through the planetary gears to rotationally drive the drive wheel about a rotational axis of the drive wheel, the non-rotating planetary carrier is fixed relative to the planetary gears.

In another aspect, the present subject matter is directed to an axle support assembly for a steerable drive axle of a tracked work vehicle, wherein the work vehicle comprises a track assembly including a track and a drive wheel configured to rotationally drive the track. The axle support assembly may generally include an inboard support member configured to pivot relative to an axle body of the steerable drive axle, with the inboard support member being configured to extend at least partially along an inboard side of the drive wheel. The axle support assembly may also include an outboard support member coupled to the inboard support member, with the outboard support member being configured to extend at least partially along an outboard side of the drive wheel. In addition, the axle support assembly may include a non-rotating planetary carrier extending lengthwise between an inboard end and an outboard end. The inboard end may be coupled to the inboard support member and the outboard end may be coupled to the outboard support member. The non-rotating planetary carrier may be configured to support a plurality of planetary gears between the inboard and outboard ends. When rotational motion is being transmitted through the planetary gears to rotationally drive the drive wheel about a rotational axis of the drive wheel, the non-rotating planetary carrier remains fixed relative to the planetary gears.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
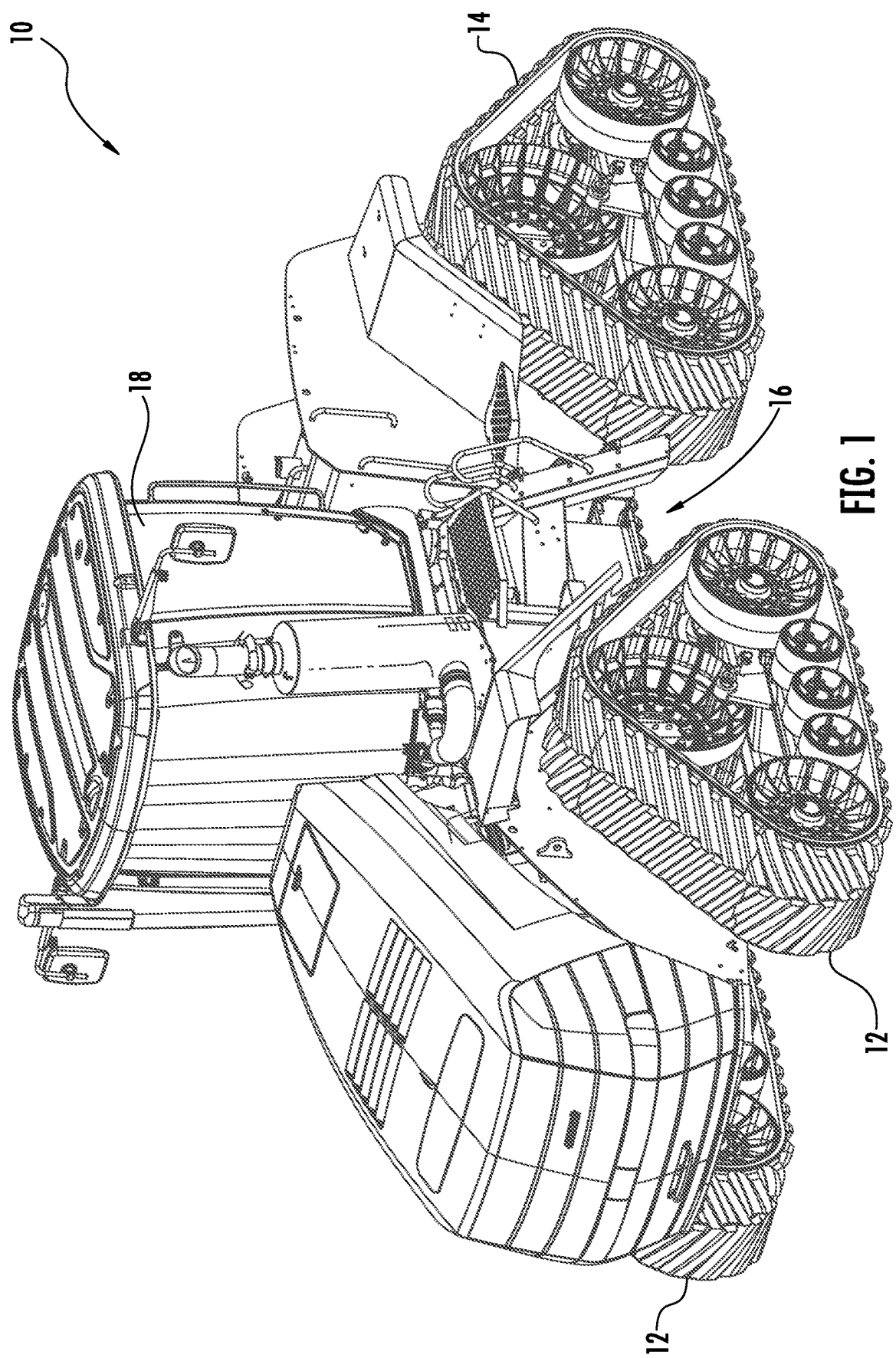
FIG. 1 illustrates a perspective view of one embodiment of a tracked work vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a steerable drive axle for a tracked work vehicle. Specifically, in several embodiments, the steerable drive axle incorporates a non-rotating planetary carrier and supporting structure that is configured to eliminate cantilevered loading on the related gear assembly and other associated components. For instance, as will be described below, the planetary carrier may be coupled between a non-rotating inboard support member of the drive axle and a non-rotating outboard support member of the drive axle. The inboard and outboard support members may, in turn, be coupled to a component of the undercarriage support system of the associated track assembly of the work vehicle, such as the undercarriage support beam. As such, the inboard and outboard support members may provide structural support along the inboard and outboard ends of the planetary carrier to counteract any downward loads transmitted to the carrier via the drive wheel, thereby balancing the loads across the carrier and preventing a cantilevered loading condition.

It should be appreciated that, although the disclosed steerable drive axle will be described herein with reference to its use within a tractor, the steerable drive axle may generally be utilized within any suitable work vehicle. For instance, the steerable drive axle may also be used within a combine harvester, such as the rear axle of the combine.

Referring now to the drawings, FIG. 1 illustrates a perspective view of one embodiment of a work vehicle 10. As shown, the work vehicle 10 is configured as an agricultural tractor. However, in other embodiments, the work vehicle 10 may be configured as any other suitable work vehicle known in the art, including those for agricultural and construction applications, transport, sport, and/or the like.

As shown in FIG. 1, the work vehicle 10 includes a pair of front track assemblies 12, a pair of rear track assemblies 14 (only one of which is shown), and a chassis 16 coupled to and supported by the track assemblies 12, 14. Additionally, an enclosed operator's cab 18 is supported by a portion of the chassis 16 and may house various control devices (not shown) for permitting an operator to control the operation of the work vehicle 10.

It should be appreciated that the configuration of the work vehicle 10 described above and shown in FIG. 1 is provided only to place the present subject matter in an exemplary field of use. Thus, it should be apparent that the present subject matter may be readily adaptable to any manner of work vehicle configuration. For example, in an alternative embodiment, the work vehicle 10 may include an open operator's cab 18 and/or may be configured to be operably coupled to any suitable type of work implement, such as a trailer, spray boom, manure tank, feed grinder, plow and/or the like.

Figure 2:
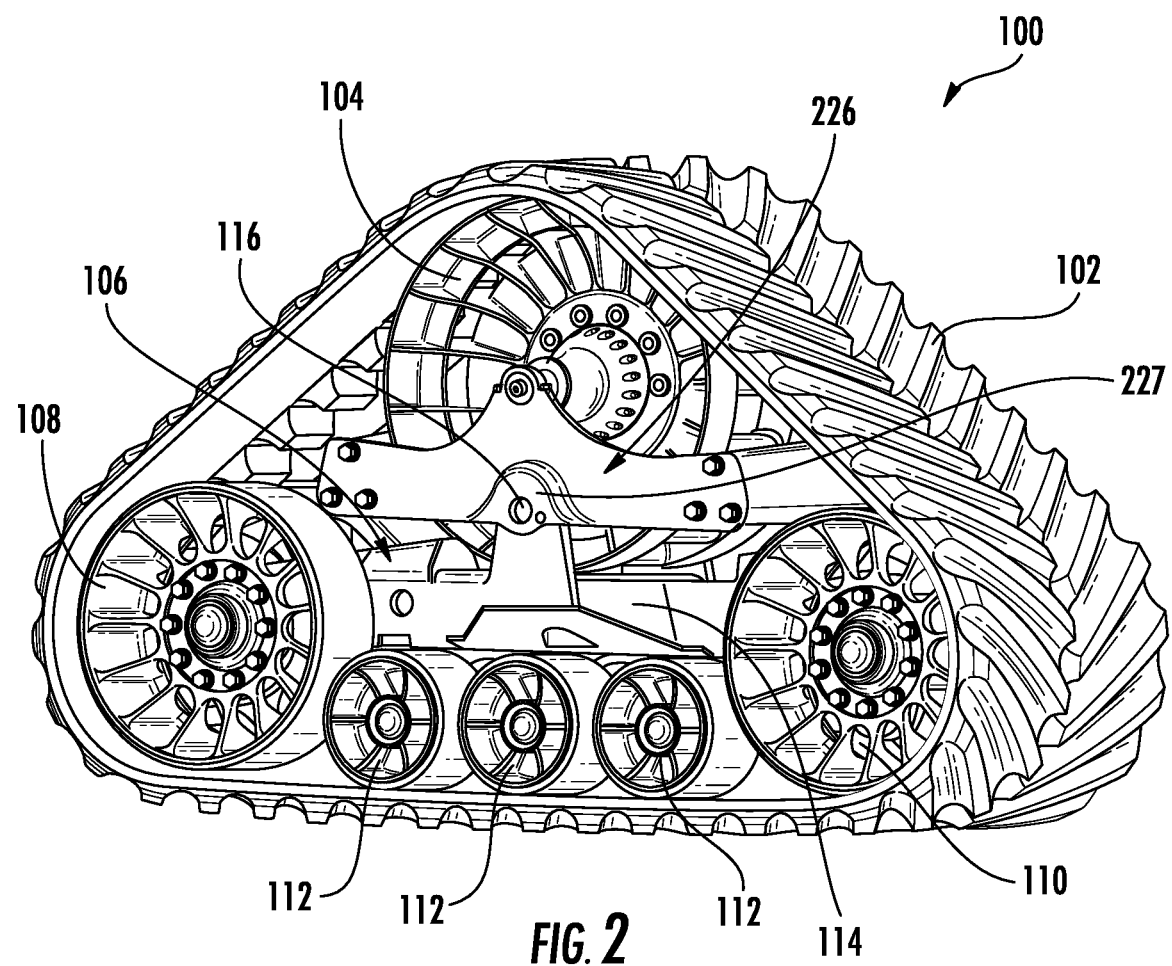
FIG. 2 illustrates a perspective view of one embodiment of a track assembly suitable for use with the work vehicle shown in FIG. 1.

Referring now to FIG. 2, a perspective view of one embodiment of a track assembly 100 suitable for use with work vehicle 10 shown in FIG. 1 is illustrated in accordance with aspects of the present subject matter. It should be appreciated that the track assembly 100 may, in several embodiments, correspond to one of the front track assemblies 12 and/or one of the rear track assemblies 14 of the work vehicle 10 described above.

As shown, the track assembly 100 may generally include a track 102, a drive wheel 104 for mechanically engaging the track 102, and a suspension system 106 for supporting the weight of the work vehicle 10 and for damping vibrations and other movement between the track 102 and the vehicle's chassis 16. In one embodiment, the suspension system 106 may include front and rear idler wheels 108, 110 about which the track 102 is wrapped and a plurality of roller wheels 112 for guiding the track 102 between the idler wheels 108, 110. Additionally, the suspension system 106 may include an undercarriage support beam 114 configured to support the non-drive wheels, such as the idler wheels 108, 110 and the roller wheels 112, relative to the track 102. For example, as shown in FIG. 2, the undercarriage support beam 114 may extend fore-to-aft within the track assembly 100 to allow the various wheels 108, 110, 112 to be coupled thereto.

Figure 8:
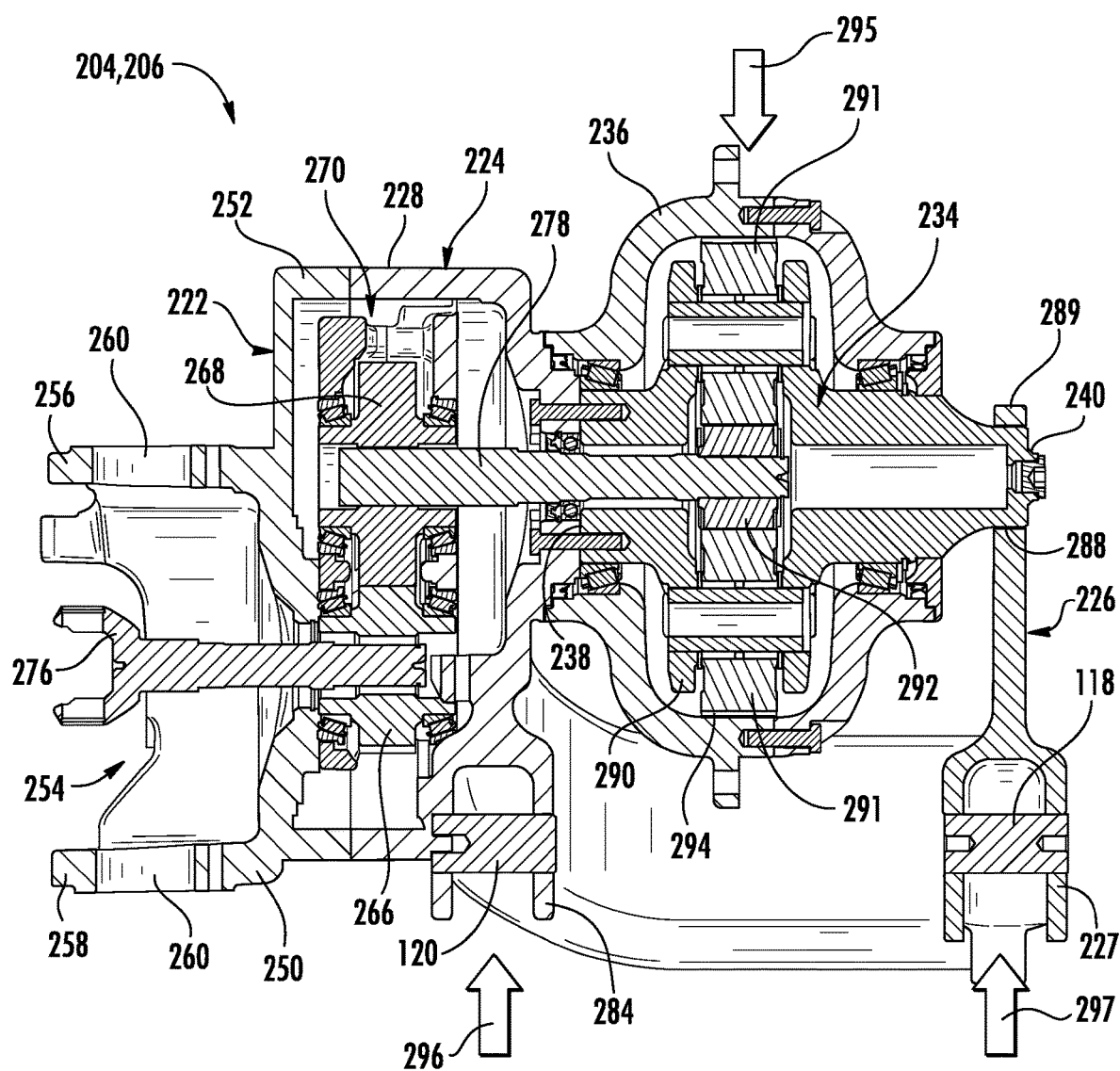
FIG. 8 illustrates a cross-sectional view of the of the axle support assembly shown in FIG. 5 taken about line 8-8.

Moreover, in several embodiments, the undercarriage support beam 114 may be configured to be coupled to the vehicle chassis 16 via connections made using two pivot pins, namely an outboard pivot pin 118 and an inboard pivot pin 120 (FIG. 8). The outboard pivot pin 118 is located along an outboard side of the drive wheel 104 while the inboard pivot pin 120 is located along inboard side of the drive wheel 104. In general, the outboard pivot pin 118 may be configured to be coupled between an outboard support member 226 of the disclosed drive axle 200 (described below) and the undercarriage support beam 114. For example, the outboard support member 226 may include an outboard clevis 227 at its bottom end that is configured to receive a portion of the undercarriage support beam 114. In such an embodiment, the pivot pin 120 may be configured to be inserted through both the outboard clevis 227 and a corresponding outboard opening (not shown) defined in the support beam 114 to couple the undercarriage support beam 114 to the outboard support member 226.

It should be appreciated that a similar pivotal support arrangement may also be provided inboard of the drive wheel 104 utilizing the inboard pivot pin 120. For example, as will be described below, the inboard pivot pin 120 may be configured to be received within a suitable opening (not shown) defined in the undercarriage support beam 114 for coupling the support beam 114 to an inboard support member 224 (FIG. 3) of the disclosed drive axle 200.

It should also be appreciated that the track assembly 100 shown in FIG. 2 is simply illustrated to provide one example of a suitable track assembly configuration. In other embodiments, the track assembly 100 may have any other suitable track-based configuration.

Figure 3:
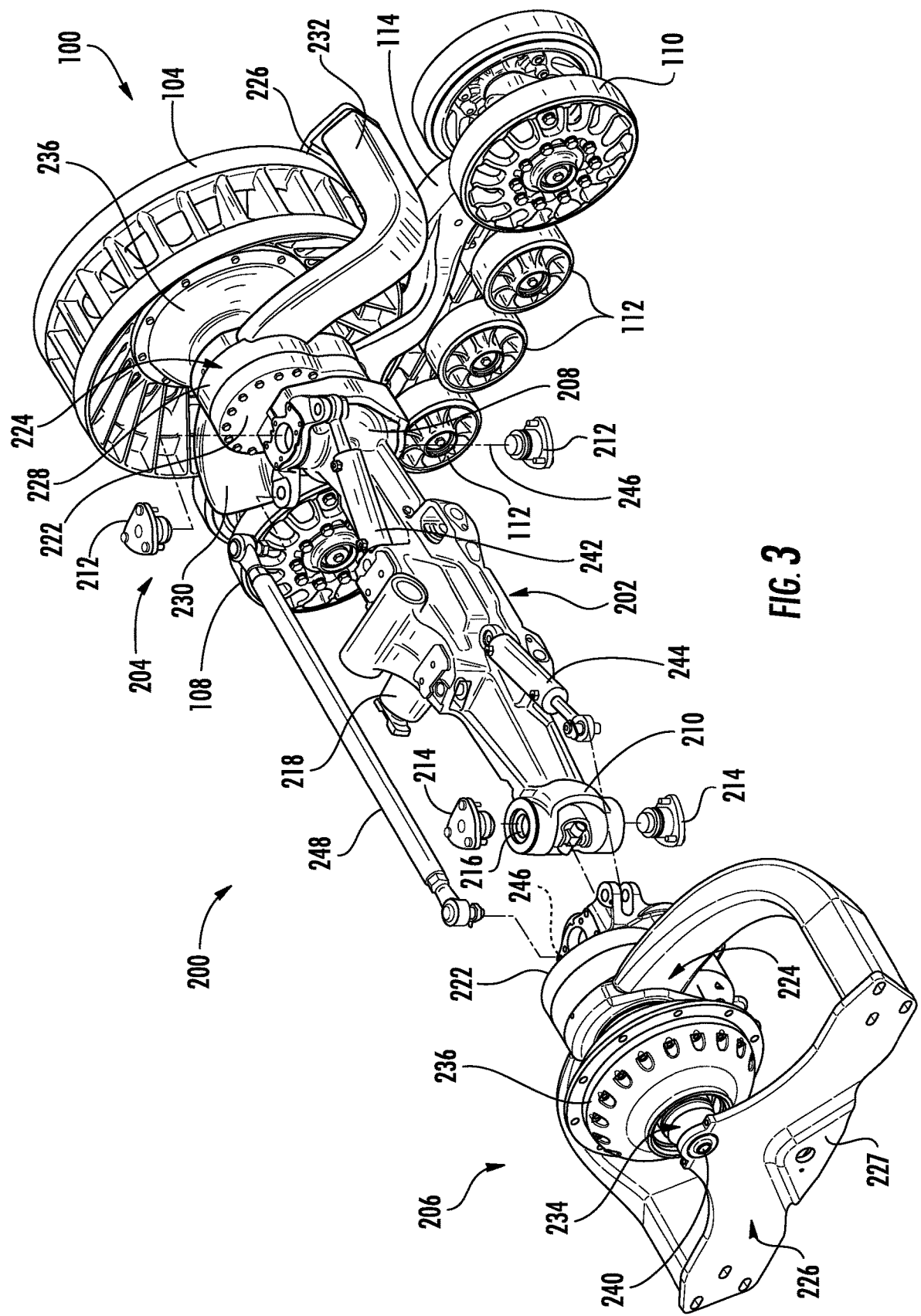
FIG. 3 illustrates a perspective, partially exploded view of one embodiment of a steerable drive axle in accordance with aspects of the present subject matter.

Referring now to FIG. 3, a perspective view of one embodiment of a steerable drive axle 100 suitable for use within a tracked work vehicle is illustrated in accordance with aspects of the present subject matter. Specifically, FIG. 3 illustrates the drive axle 100 installed relative to the track assembly 100 described above with reference to FIG. 2, with the track 102 of the track assembly 100 being removed for purposes of illustration. In the illustrated embodiment, the track assembly 100 is installed at one end of the drive axle 100. It should be appreciated that the drive axle 100 is also configured to have another track assembly 100 installed at its opposed end such that the drive axle 100 extends directly between a pair of track assemblies of a work vehicle, such as the pairs of front and/or rear track assemblies 12, 14 described above. However, for purposes of illustration, the second track assembly is not shown in FIG. 3. Additionally, FIG. 3 also illustrates several steering-related components of the disclosed drive axle 200 exploded out for purposes of illustration.

As shown in FIG. 3, the drive axle 200 may generally include an axle body 202 coupled between a first axle support assembly 204 and a second axle support assembly 206. Specifically, the axle body 202 may be configured to extend lengthwise between a first end 208 and a second end 210, with the first end 208 being coupled to the first axle support assembly 204 and the second end 210 being coupled to the second axle support assembly 206. In several embodiments, a pinned or pivotal connection may be provided between the axle body 202 and each axle support assembly 204, 206 to allow the axle support assemblies 204, 206 (and, thus, the track assemblies 100) to be pivoted relative to the axle body 202. For instance, as shown in FIG. 3, a first set of steering king pins 212 may be inserted through portions of the first axle support assembly 204 and into corresponding openings (not shown) defined through the first end 208 of the axle body 202 to pivotally couple the first axle support assembly 204 to the axle body 202. Additionally, a second set of steering king pins 214 may be inserted through portions of the second axle support assembly 206 and into corresponding openings 216 (one of which is shown) defined through the second end 210 of the axle body 202 to pivotally couple the second axle support assembly 206 to the axle body 202.

It should be appreciated that, although not shown, a differential gearset may be housed within the axle body 202 at a generally central location defined between its first and second ends 208, 210. As is generally understood, a drive shaft 218 of the work vehicle may be operably coupled to the differential. Additionally, the axle body 202 may house one or more axle shafts 220 (FIG. 10) extending outwardly from the differential to each end of the axle body 202, respectively. As such, the rotational motion of the drive shaft 218 may be transmitted through the differential to the axle shaft(s) 220. The rotational motion of the axle shaft(s) 220 may then be transferred through the axle support assemblies 204, 206 to the corresponding drive wheels 104 of the track assemblies 100 to rotationally drive each associated track 102.

As will be described in greater detail below, each axle support assembly 204, 206 may, in several embodiments, include a gear housing 222 configured to be directly coupled to the adjacent end 208, 210 of the axle body 202. For instance, as shown in FIG. 3, the first end 208 of the axle body 202 may be configured to be pivotally coupled to the gear housing 222 of the first axle support assembly 204 (e.g., via the first set of steering king pins 212). Similarly, the second end 210 of the axle body 202 may be configured to be pivotally coupled to the gear housing 222 of the second axle support assembly 206 (e.g., via the second set of steering king pins 214). When incorporated into the disclosed axle support assemblies 204, 206, the gear housing 222 may allow the drive axle 200 to have an offset configuration in which the rotational axis of the axle shaft(s) 220 is vertically offset from the rotational axis of the drive wheels 104. Such an offset configuration may allow the axle to be placed closer to the ground, thereby providing additional space for any underhood components of the work vehicle, such as the engine and/or transmission of the work vehicle.

Additionally, each axle support assembly 204, 206 may include an inboard support member 224 located at least partially along an inboard side of the drive wheel 104. In several embodiments, the inboard support member 224 may be configured to be rigidly coupled between the gear housing 222 and the outboard support member 226 previously described above with reference to FIG. 2. In general, the inboard support member 224 may include a support body configured to be coupled to both the gear housing 222 and the undercarriage support beam 114 of the associated track assembly 100. In addition, the inboard support member 224 may include first and second support arms 230, 232 extending outwardly from the support body 228. For example, as shown in FIG. 3, the support arms 230, 232 may extend outwardly from opposed sides of the support body 228 along the inboard side of the drive wheel 104 and then axially along either side of the drive wheel 104 to allow the support arms 230, 232 to be coupled to opposed ends of the outboard support member 226.

Moreover, each axle support assembly 204, 206 may also include a fixed or non-rotating planetary gear carrier 234 extending within an outer planetary casing 236, with the outer planetary casing being configured to be rigidly coupled to the drive wheel 104 of the associated track assembly 100. As will be described below, the planetary carrier 234 may include an inboard end 238 (FIG. 6) rigidly coupled to the inboard support member 224 and an outboard end 240 supported by the outboard support member 226. For instance, as shown in FIG. 3, the outboard end 240 of the planetary carrier 234 may be supported at a top end of the outboard support member 224 such that the outboard support member 224 vertically supports the outboard end 240 of the planetary carrier 234 relative to the undercarriage support beam 114 of the associated track assembly 100. Additionally, the planetary carrier 234 may be configured to support a gear assembly (e.g., a sun gear and planetary gears) for rotationally driving the outer planetary casing 236 and, thus, the drive wheel 104 of the track assembly 100.

Referring still to FIG. 3, the disclosed drive axle 100 may also incorporate one or more steering-related components to facilitate steering or pivoting the track assemblies 100 relative to the axle body 202. For instance, as shown in the illustrated embodiment, steering cylinders 242, 244 may be coupled between the axle body 204 and each axle support assembly 204, 206. Specifically, a first steering cylinder 242 may be coupled between the axle body 202 and the gear housing 222 of the first axle assembly 204 and a second steering cylinder 244 may be coupled between the axle body 204 and the gear housing 222 of the second axle assembly 206. Thus, by controlling the actuation of the steering cylinders 242, 244, the axle support assemblies 204, 206

(and, thus, the track assemblies 100) may be pivoted relative to the axle body 202 about the vertical pivot axes 246 defined between the support assemblies 204, 206 and the axle body 202. Additionally, as shown in FIG. 3, a steering tie rod 248 may be configured to be coupled between the gear housing 222 of the first axle support assembly 204 and the gear housing 222 of the second axle support assembly 206 to facilitate synchronized rotation or steering of the track assemblies 100 relative to the axle body 202.

Figure 4:
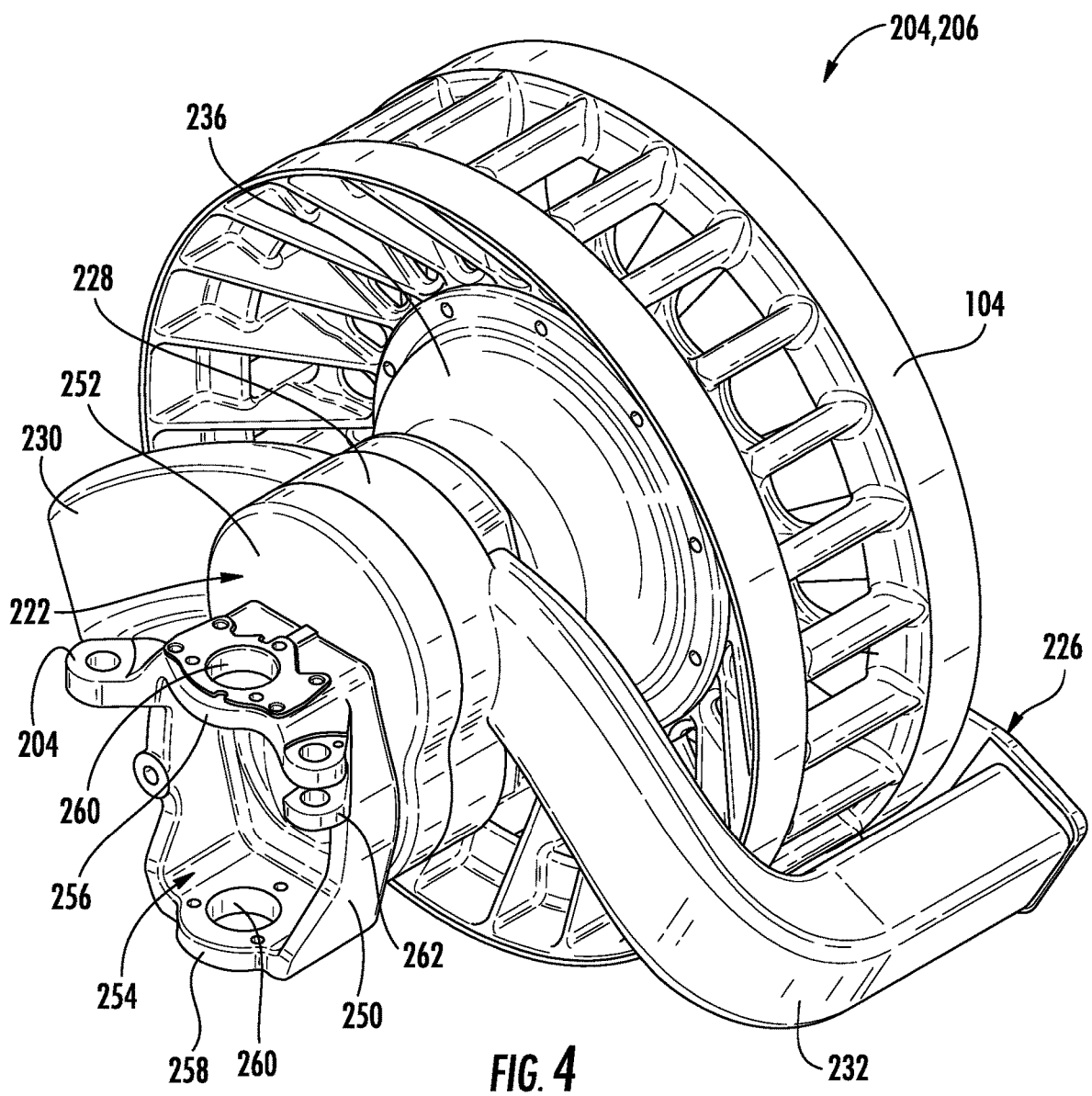
FIG. 4 illustrates a perspective, inboard view of one embodiment of an axle support assembly suitable for use with the steerable drive axle shown in FIG. 3, particularly illustrating a drive wheel of track assembly supported by the axle support assembly.
Figure 5:
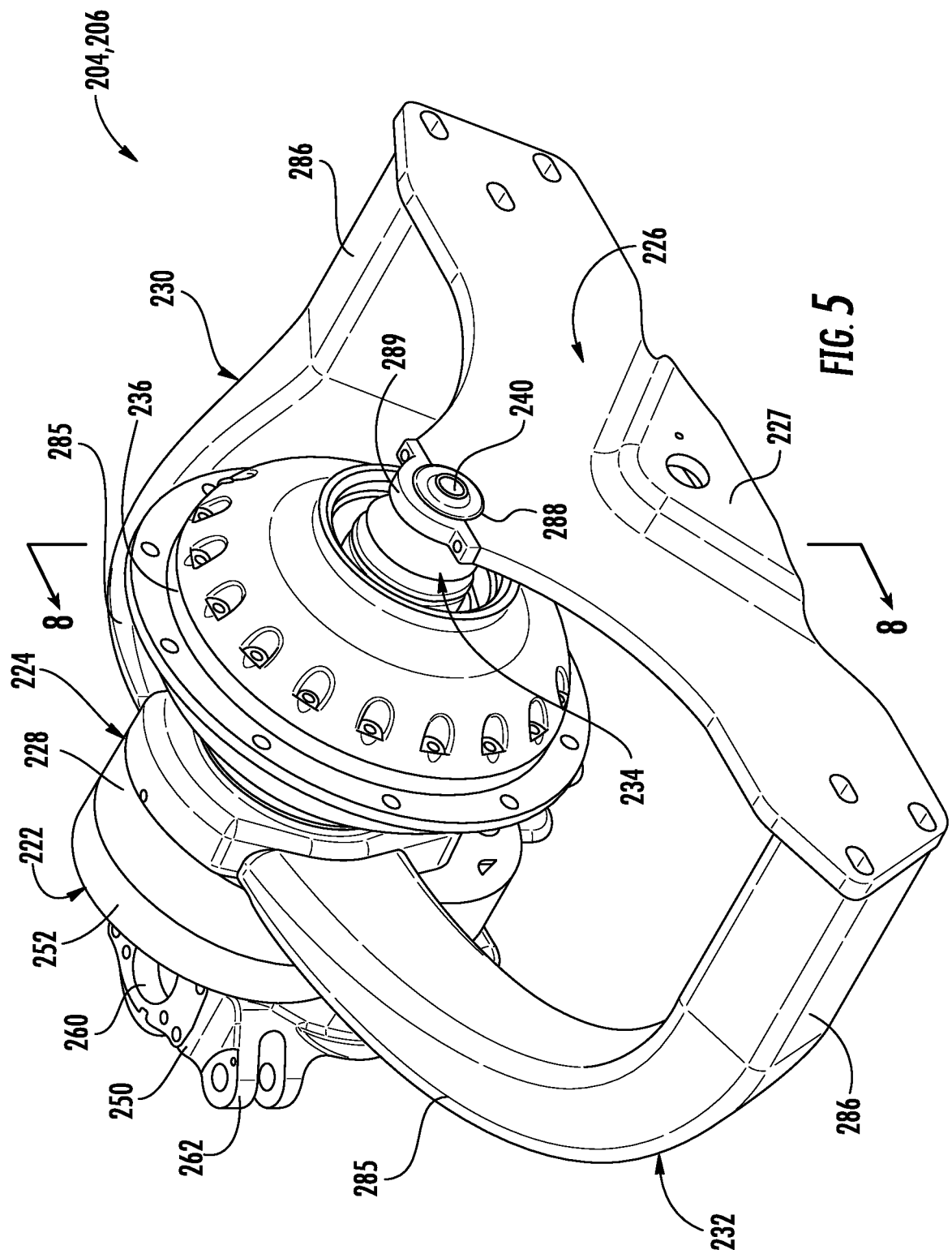
FIG. 5 illustrates a perspective, outboard view of the axle support assembly shown in FIG. 4, with the drive wheel removed for purposes of illustration.
Figure 6:
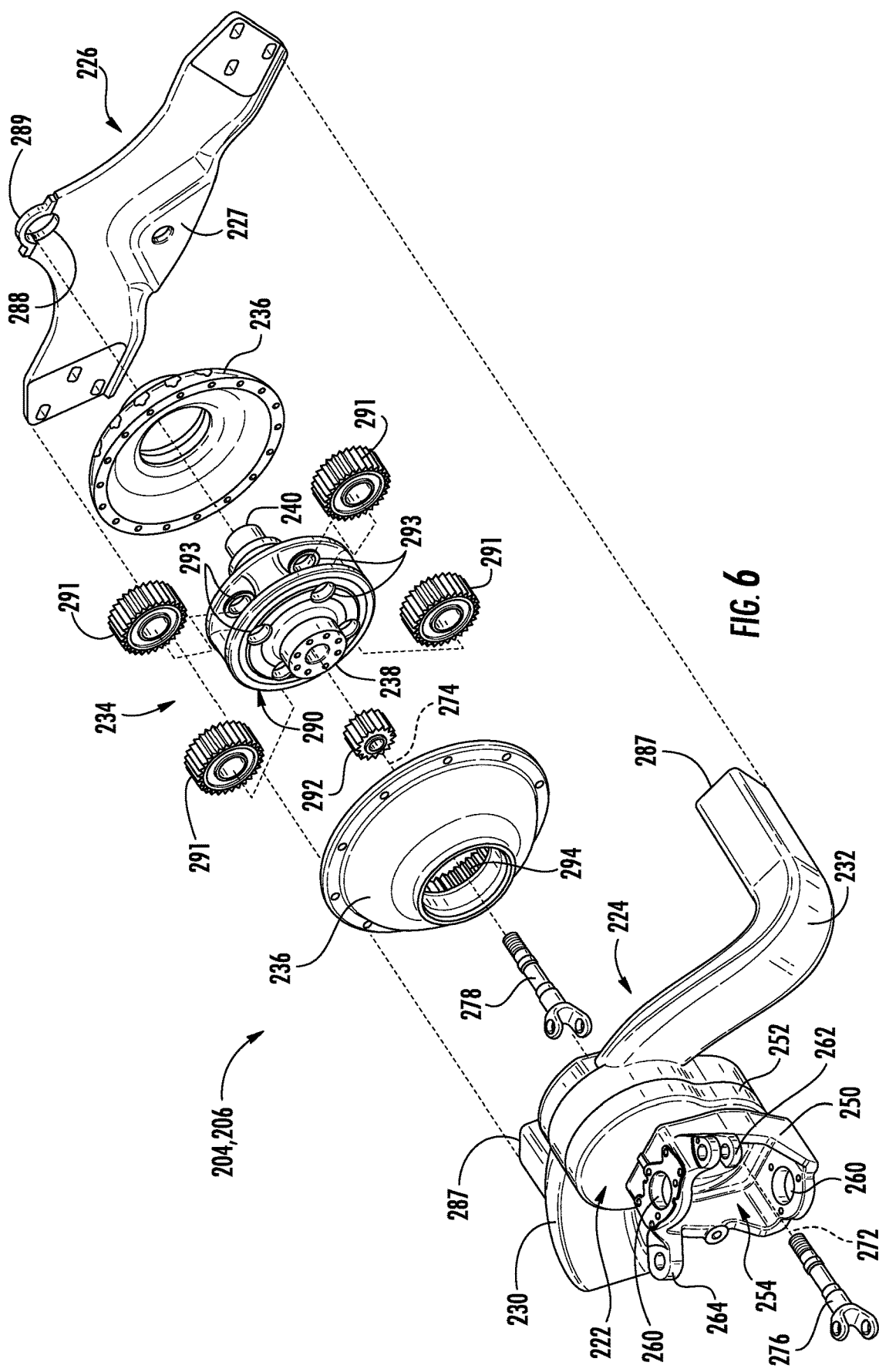
FIG. 6 illustrates an inboard perspective, partially exploded view of the axle support assembly shown in FIG. 5.
Figure 7:
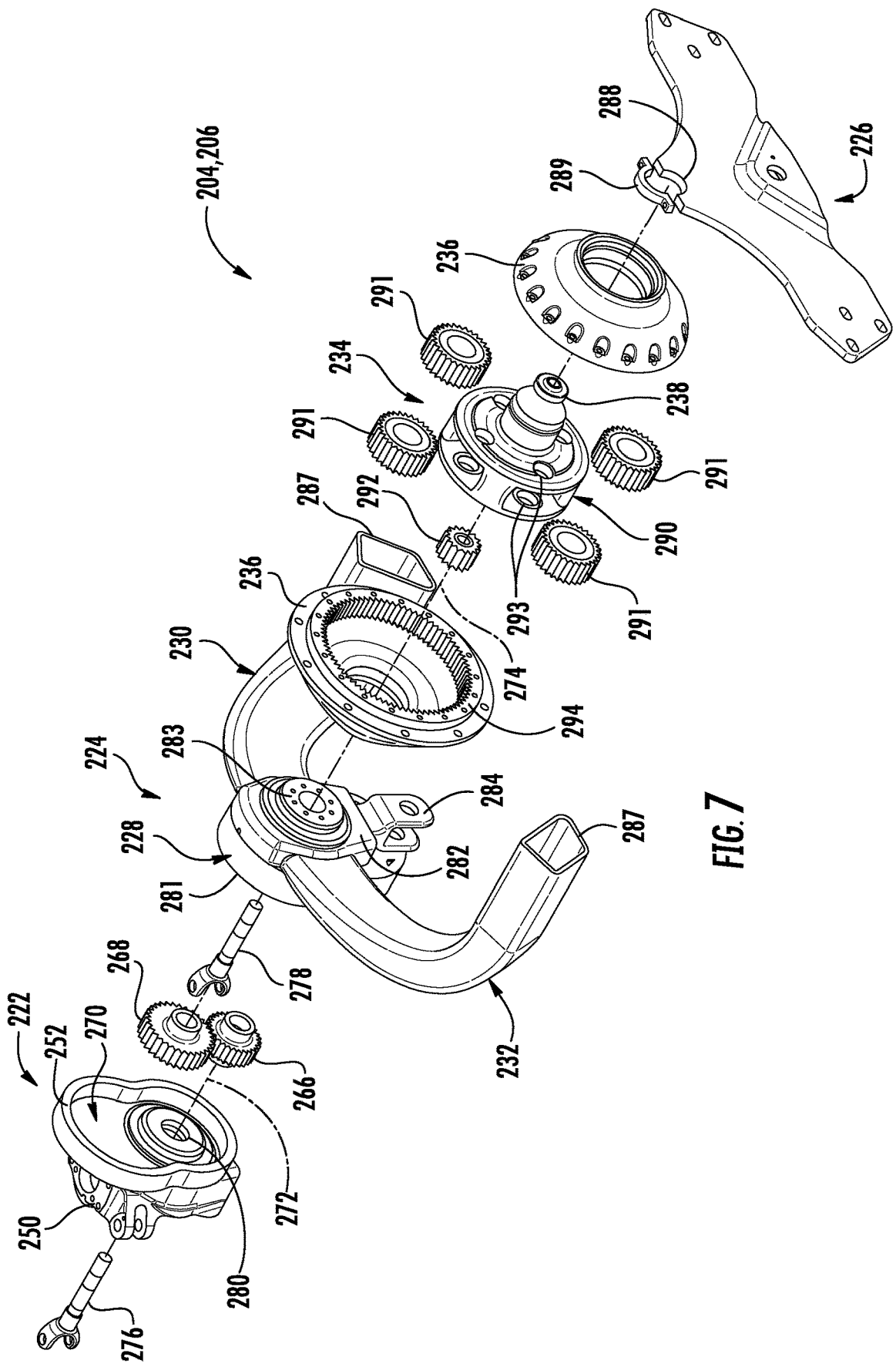
FIG. 7 illustrates an outboard perspective, exploded view of the axle support assembly shown in FIG. 5.

Referring now to FIGS. 4-8, various views of one of the axle support assemblies 204, 206 described above are illustrated in accordance with aspects of the present subject matter. Specifically, FIG. 4 illustrates an inboard, perspective view of the axle support assembly 204, 206, with the drive wheel 104 of the associated track assembly 100 being shown coupled to the outer planetary casing 236. FIG. 5 illustrates an outboard, perspective view of the axle support assembly 204, 206 with the drive wheel 104 removed for purposes of illustration. FIG. 6 and 7 illustrate exploded, inboard and outboard perspective views of the axle support assembly 204, 206 shown in FIG. 5, respectively, with the gear housing 222 and the inboard support member 224 being shown coupled together in FIG. 6 and exploded away from each other in FIG. 7 to illustrate the gears housed between the gear housing 222 and the inboard support member 224. Additionally, FIG. 8 illustrates a cross-sectional view of the axle support assembly 204, 206 shown in FIG. 5 taken about line 8-8.

As indicated above, the axle support assembly 204, 206 may generally include a gear housing 222, an inboard support member 224 coupled to the gear housing 222, an outboard support member 224 coupled to the inboard support member 222, and a non-rotating planetary carrier 234 coupled between the inboard and outboard support members 224, 226. As particularly shown in FIG. 4, the gear housing 222 may include both an axle end portion 250 configured to be coupled to one of the ends 208, 210 of the axle body 202 and a housing portion 252 configured to be coupled to the inboard support member 224. In this regard, the axle end portion 250 may include or define one or more attachment features to facilitate coupling the axle body 202 to the gear housing 222. Specifically, in one embodiment, the axle end portion 250 of the gear housing 222 may be configured to define an open-ended channel 254 configured to receive the adjacent end 208, 210 of the axle body 202. For instance, as shown in FIG. 4, the channel 254 may extend vertically from an upper wall 256 to a lower wall 258 such that the adjacent end 208, 210 of the axle body 202 may be inserted into the channel 254 between the upper and lower walls 256, 258. Once the end 208, 210 of the axle body 202 is received within the channel 254, the corresponding set of steering king pins 212, 214 may be inserted through openings 260 defined through the upper and lower walls 256, 258 and into the corresponding openings 216 (FIG. 3) defined by the axle body 202 to pivotally couple the axle support assembly 204, 206 to the axle body 202. Additionally, as shown in FIG. 4, the axle end portion 250 of the gear housing 222 may include suitable features for coupling one or more of the steering-related components to the axle support assembly 204, 206. For instance, the axle end portion 250 may include both a clevis 262 extending from one side of the gear housing 222 that is configured to be coupled to the corresponding steering cylinder 242, 244 and a mounting flange 264 extending from the other side of the gear housing 222 that is configured to be coupled to one end of the tie rod 248.

The housing portion 252 of the gear housing 222 may generally be configured to at least partially define an open volume or cavity for housing first and second drive gears 266, 268 of the disclosed drive axle 200. Specifically, when the housing portion 252 is coupled directly to the support body 228 of the inboard support member 224, a gear cavity 270 (FIG. 8) may be defined between the housing portion 252 and the support body 228 within which the drive gears 266, 268 may be rotationally supported. As particularly shown in FIG. 7, the drive gears 266, 268 may be configured to be stacked vertically within the gear cavity 270 to create a vertical offset between a rotational axis 272 of the axle shaft(s) 220 and a rotational axis 274 of the drive wheel 104. For instance, a first input shaft 276 of the axle support assembly 204, 206 may be coupled to the adjacent axle shaft(s) 220 and extend through a shaft opening 280 defined through the gear housing 222 for rotationally driving the first drive gear 266 about the rotational axis 272 of the axle shaft(s) 220. The meshing of the drive gears 266, 268 may allow the rotation of the first drive gear 266 to be transferred to the second drive gear 268, which may then rotationally drive a. second input gear 278 about the rotational axis 274 of the drive wheel 104.

Referring still to FIGS. 4-8, in several embodiments, the support body 228 of the inboard support member 224 may generally be configured to extend between a first axial end 281 (FIG. 7) and a second axial end 282 (FIG. 7). As shown in FIGS. 4-6, the first axial end 281 of the support body 228 may be configured to be rigidly coupled to the housing portion 252 of the gear housing 222 to define the gear cavity 270 for the drive gears 266, 268. Additionally, the second axial end 282 of the support body 228 may be configured to be coupled directly to the inboard end 238 of the planetary carrier 234. For instance, as shown in FIG. 7, the second axial end 282 of the support body 228 may define a planar mounting face 283 configured to be coupled to the inboard end 238 of the planetary carrier 234. Additionally, as shown in the illustrated embodiment, the support body 228 may include an inboard clevis 284 configured to receive the inboard pivot pin 118 (FIG. 9) for coupling the inboard support member 224 to the undercarriage support beam 114 of the associated track assembly 100.

As indicated above, the inboard support member 224 may also include first and second support arms 230, 232 configured to extend outwardly from the support body 228 so as to wrap around a portion of the drive wheel 104. For instance, as shown in FIG. 5, each support arm 230, 232 may include an inboard arm portion 285 extending outwardly from the support body 229 along the inboard side of the drive wheel 104 and an extension arm portion 286 extending axially from the adjacent inboard arm portion 285 along one of the sides of the drive wheel 104 such that an end 287 of each arm 230, 232 is located directly adjacent to the opposed ends of the outboard support member 226. The ends 287 of the arms 230, 232 may then be mounted to the outboard support member 226 (e.g., using suitable mechanical fasteners) to directly couple the inboard and outboard support members 224, 224 to each other.

Referring still to FIGS. 4-8, as indicated above, the non-rotating planetary carrier 234 of the axle support assembly 204, 206 may generally be configured to extend lengthwise between inboard and outboard ends 238, 240, with the inboard end 238 being rigidly coupled to the support body 228 of the inboard support member 224 (e.g., at the mounting face 283) and the outboard end 240 being supported by the outboard support member 226. For instance, as shown in FIG. 7, the outboard support member 246 may include a semi-circular groove 288 defined at its top end that is configured to receive the outboard end 240 of the non-rotating carrier 234. A clamp member 289 may then be positioned around the remainder of the outboard end 240 and coupled to the top end of the outboard support member 246 to clamp the outboard end 240 to the outboard support member 246.

Additionally, as shown in FIGS. 6 and 7, the planetary carrier 234 may also include a gear cage 290 disposed between its inboard and outboard ends 238, 240 that is configured to rotationally support a plurality of planetary gears 291 relative to a sun gear 292 rotationally coupled to the second input shaft 278. For instance, the sun gear 292 may be supported by the carrier 234 at the center of the gear cage 290 and the planetary gears 291 may be coupled to the gear cage 290 at differing mounting locations spaced circumferentially around the sun gear 292 such that each planetary gear 291 is configured to mesh with and be rotationally driven by the sun gear 292. Specifically, as shown in the illustrated embodiment, the gear cage 290 may include a pair of aligned openings 293 at each mounting location that is configured to receive a mounting pin (not shown) for coupling each planetary gear 291 to the gear cage 290. As such, when the sun gear 292 is rotated relative to the non-rotating carrier 234 (e.g., via rotation of the second input shaft 278), the planetary gears 291 may be similarly rotated about each mounting pin relative to the carrier 234. Additionally, the planetary gears 292 may be configured to mesh with an outer ring gear 294 coupled to the inner circumference of the outer planetary casing 236. Thus, rotation of the planetary gears 292 may, in turn, rotationally drive the ring gear 294, thereby resulting in rotation of the outer planetary casing 236 and, thus, the drive wheel 104 coupled thereto.

It should be appreciated that, although the planetary carrier 234 is shown in the illustrated embodiment as supporting four planetary gears 291, the carrier 234 may generally be configured to support any number of planetary gears 291, such as less than four gears or greater than four gears. For instance, in one embodiment, the planetary gears 291 may be supported by the planetary carrier 234. In such an embodiment, the planetary carrier 234 may define three pairs of aligned openings 293 for coupling the planetary gears 291 to the carrier 234.

During operation of the disclosed axle support assembly 204, 206, rotational motion of the corresponding axle shaft(s) 220 is transferred from the first input shaft 276 to the second input shaft 278 via the meshing of the first and second drive gears 266, 268. Since the second input shaft 278 is rotationally coupled between the second drive gear 268 and the sun gear 292, rotation of the second input shaft 278 is transferred to the sun gear 292, which rotationally drives the planetary gears 291. The rotation of the planetary gears 291 then drives the outer planetary casing 236 (e.g., via the ring gear 294) such that rotational motion from the axle shaft(s) 220 is transferred to the drive wheel 104 to rotationally drive the track assembly 100. It should be appreciated that the gear housing 222, the inboard support member 224, the planetary carrier 234, and the outboard support member 226 all remain fixed relative to the various gears and shafts and, thus, do not rotate about the rotational axis 272 of the axle shaft(s) 220 or the rotational axis 274 of the drive wheel 104. However, as indicated above, such components may be pivoted relative to the axle body 202 about the pivot axes 246 defined by the steering king pins 212, 214 when steering the track assemblies 100.

As indicated above, by configuring the axle support assembly 204, 206 in the manner described herein, the forces applied to the planetary carrier 234 during operation of the work vehicle 10 may be evenly balanced between the inboard and outboard ends 238, 240 of the carrier 234. For instance, as shown in FIG. 8, a downward force (e.g., indicated by arrow 295) may be transmitted to the planetary carrier 234 due the track tension forces applied through the drive wheel 104. However, given the connection made between the undercarriage support beam 114 and the inboard support member 224 via the inboard pivot pin 118 and the connection made between the undercarriage support beam 114 and the outboard support member 226 via the outboard pivot pin 116, upward reactive forces (e.g., indicated by arrows 296, 297) may be applied through the inboard and outboard support members 224, 226 to prevent a cantilevered loading condition on the carrier 234. As such, by balancing the load on the non-rotating carrier 234, various components of the gear assembly (e.g., the planetary bearings and other related structure) may be made lighter and/or from less expensive materials, thereby reducing the weight and overall costs of the assembly 204, 206.

Figure 9:
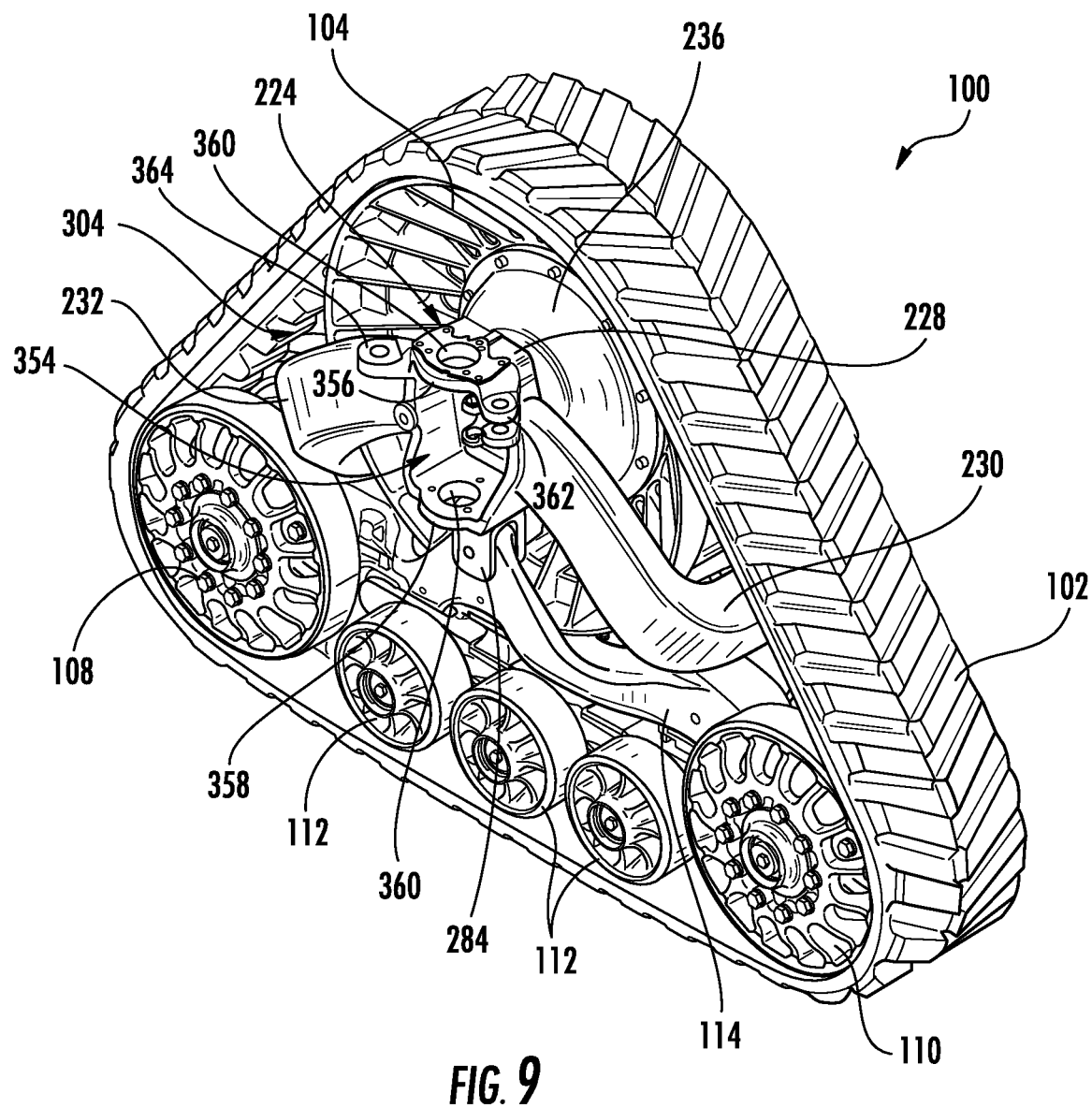
FIG. 9 illustrates a perspective view of another embodiment of an axle support assembly suitable for use with the steerable drive axle shown in FIG. 3.
Figure 10:
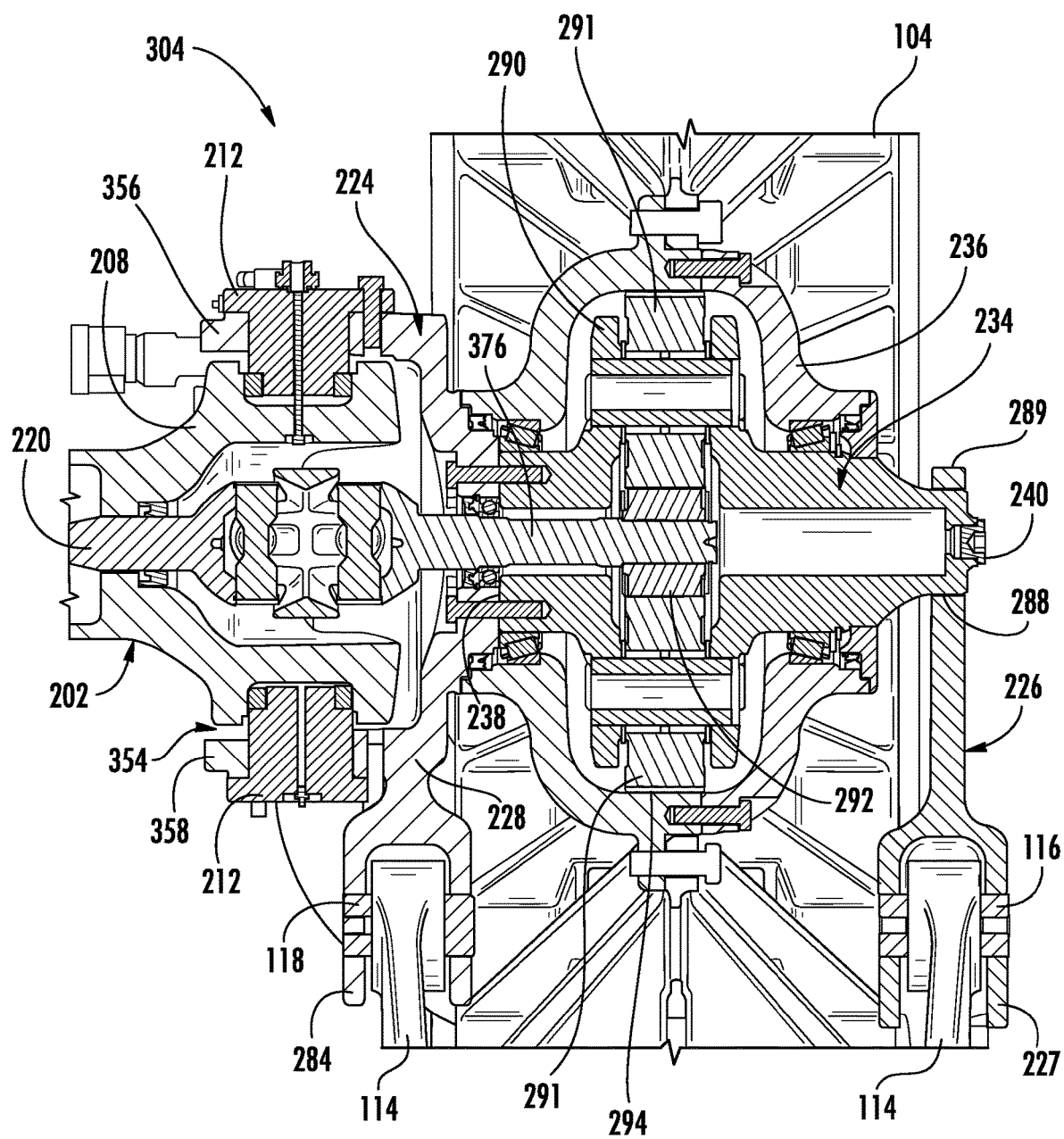
FIG. 10 illustrates a cross-sectional view of the axle support assembly shown in FIG. 9.

Referring now to FIGS. 9 and 10, an alternative embodiment of an axle support assembly 304 that may be utilized as part of the steerable drive axle 200 described herein is illustrated in accordance with aspects of the present subject matter. Specifically, FIG. 9 illustrates a perspective, inboard view of the axle support assembly 304 installed relative to a track assembly 100. Additionally, FIG. 10 illustrates a cross-sectional view of the axle support assembly 304 shown in FIG. 9.

In general, the axle support assembly 304 is configured the same as or similar to the axle support assemblies 204, 206 described above except that the gear housing 222 has been removed to create a straight or non-offset configuration in which the rotational axis of the axle shaft(s) 220 (FIG. 10) is generally aligned with the rotational axis of the drive wheel 104. In such an embodiment, the support body 228 of the inboard support member 224 may be reconfigured slightly from that described above with reference to FIGS. 3-8 to allow the axle body 202 to be pivotally coupled directly to the inboard support member 224 and to accommodate the steering-related components of the drive axle 200. Specifically, in several embodiments, the first axial end 281 of the support body 228 may include or define one or more attachment features to facilitate coupling the axle body 202 to the inboard support member 224, such as by defining an open-ended channel 354 configured to receive the adjacent end 208, 210 of the axle body 202 in a manner similar to the channel 254 of the gear housing 222 described above. For instance, as shown in FIG. 9, the channel 354 may extend vertically from an upper wall 356 to a lower wall 358 of the support body 228 such that the adjacent end 208, 210 of the axle body 202 may be inserted into the channel 354 between the upper and lower walls 356, 358. Once the end 208, 210 of the axle body 202 is received within the channel 254, the corresponding set of steering king pins 212, 214 may be inserted through openings 360 defined through the upper and lower walls 356, 358 and into the corresponding openings 216 (FIG. 3) defined by the axle body 202 to pivotally couple the axle support assembly 304 to the axle body 202. Additionally, as shown in FIG. 9, the support body 228 of the inboard support member 224 may also include suitable features for coupling one or more of the steering-related components to the axle support assembly 304. For instance, the support body 228 may include both a clevis 362 extending from one side of the support body 228 that is configured to be coupled to the corresponding steering cylinder 242, 244 and a mounting flange 364 extending from the other side of the support body 228 that is configured to be coupled to one end of the tie rod 248.

It should be appreciated that, by utilizing a straight or non-offset configuration as opposed to an offset configuration, the axle support assembly 203 may also only include a single input shaft 376. For instance, as shown in FIG. 10, the input shaft 376 may be coupled to the axle shaft(s) 220 at one end and the sun gear 292 at its opposed end such that rotational motion of the axle shaft(s) 220 is transmitted through the input shaft 376 to the sun gear 292.

Beyond the distinctions highlighted above, the components of the axle support assembly 304, including the inboard support member 224, the non-rotating planetary carrier 234, and the outboard support member 226. may be configured the same as that described above with reference to FIGS. 3-8. For instance, the inboard support member 224 may include first and second support arms 230, 232 that extend outwardly from the support body 228 and wrap around the drive wheel 104 to allow the arms 230, 232 to be coupled to the opposed ends of the outboard support member 226. Additionally, the planetary carrier 234 may extend lengthwise between an inboard end 238 coupled to the inboard support member 224 and an outboard end 240 supported by the outboard support member 226 and may be configured to support a gear assembly (e.g., the sun gear 292, the planetary gears 291, and the ring gear 294) for rotationally driving the outer planetary casing 236 and, thus, the drive wheel 104. Moreover, as shown in FIG. 10, similar to that described above, the inboard and outboard support members 224, 226 may be coupled to the undercarriage support beam 114 via inboard and outboard pivot pins 118, 116, respectively. As such, the loads applied across the planetary carrier 234 may be balanced in a manner that prevents a cantilevered loading condition from being transmitted through the carrier 234 and the related gear assembly components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A steerable drive axle for a tracked work vehicle, the work vehicle comprising a track assembly including a track and a drive wheel configured to rotationally drive the track, the drive axle comprising:
    an axle body extending lengthwise between a first end and a second end;
    an axle support assembly pivotally coupled to one of the first end or the second end of the axle body, the axle support assembly comprising:
        an inboard support member configured to extend at least partially along an inboard side of the drive wheel;
        an outboard support member configured to extend at least partially along an outboard side of the drive wheel;
        a non-rotating planetary carrier extending lengthwise between an inboard end and an outboard end, the inboard end being coupled to the inboard support member and the outboard end being coupled to the outboard support member, the non-rotating planetary carrier being configured to support a plurality of planetary gears between the inboard and outboard ends; and
    a gear housing rigidly coupled to the inboard support member, the gear housing defining at least one attachment feature configured to allow the gear housing to be pivotally coupled directly to the one of the first end or the second end of the axle body,
    wherein, when rotational motion is being transmitted through the planetary gears to rotationally drive the drive wheel about a rotational axis of the drive wheel, the non-rotating planetary carrier remains fixed relative to the planetary gears.

2. The drive axle of claim 1, further comprising a steering cylinder coupled between the axle body and a portion of the axle support assembly, the steering cylinder configured to be actuated to pivot the axle support assembly relative to the axle body about a pivot axis defined between the axle support assembly and the axle body.

3. The drive axle of claim 1, wherein a gear cavity is defined between the gear housing and the inboard support member that houses vertically offset drive gears, the vertically offset drive gears providing the drive axle with an offset configuration such that a rotational axis of an axle shaft of the drive axle is vertically offset from the rotational axis of the drive wheel.

4. The drive axle of claim 1, wherein the inboard support member defines at least one attachment feature configured to allow the inboard support member to be pivotally coupled directly to the one of the first end or the second end of the axle body.

5. The drive axle of claim 1, wherein the inboard support member comprises a support body positioned on the inboard side of the drive wheel and first and second support arms extending outwardly from the support body.

6. The drive axle of claim 5, wherein each of the first and second support arms including an inboard arm portion extending outwardly from the support body along the inboard side of the drive wheel and an extension arm position extending axially from the inboard portion along an outer perimeter of the drive wheel towards the outboard side of the drive wheel.

7. The drive axle of claim 6, wherein an end of the extension arm portion of each of the first and support arms is coupled to the outboard support member.

8. The drive axle of claim 1, wherein the track assembly further comprises an undercarriage support beam configured to support a plurality of non-drive wheels of the track assembly, the inboard support member being coupled to the undercarriage support beam along the inboard side of the drive wheel and the outboard support member being coupled to the undercarriage support member along the outboard side of the drive wheel.

9. The drive axle of claim 1, further comprising an input shaft extending at least partially within the planetary carrier and a sun gear coupled to the input shaft for rotation therewith, the sun gear being supported by the planetary carrier for rotation relative to the planetary carrier about the rotational axis of the drive wheel, the sun gear being configured to rotationally drive the planetary gears.

10. A steerable drive axle for a tracked work vehicle, the work vehicle comprising a track assembly including a track and a drive wheel configured to rotationally drive the track, the drive axle comprising:

an axle body extending lengthwise between a first end and a second end;

an axle support assembly pivotally coupled to one of the first end or the second end of the axle body, the axle support assembly comprising:

an inboard support member configured to extend at least partially along an inboard side of the drive wheel;

an outboard support member configured to extend at least partially along an outboard side of the drive wheel; and a non-rotating planetary carrier extending lengthwise between an inboard end and an outboard end, the inboard end being coupled to the inboard support member and the outboard end being coupled to the outboard support member, the non-rotating planetary carrier being configured to support a plurality of planetary gears between the inboard and outboard ends; and an outer planetary casing rigidly coupled to the drive wheel, the outer planetary casing supporting a ring gear configured to mesh with the planetary gears such that rotation of the planetary gears rotationally drives the ring gear and the drive wheel about the rotational axis, wherein, when rotational motion is being transmitted through the planetary gears to rotationally drive the drive wheel about a rotational axis of the drive wheel, the non-rotating planetary carrier remains fixed relative to the planetary gears.

11. An axle support assembly for a steerable drive axle of a tracked work vehicle, the work vehicle comprising a track assembly including a track and a drive wheel configured to rotationally drive the track, the axle support assembly comprising:

an inboard support member configured to pivot relative to an axle body of the steerable drive axle, the inboard support member configured to extend at least partially along an inboard side of the drive wheel, wherein the inboard support member comprises a support body positioned on the inboard side of the drive wheel and first and second support arms extending outwardly from the support body;

an outboard support member coupled to the inboard support member, the outboard support member configured to extend at least partially along an outboard side of the drive wheel; and a non-rotating planetary carrier extending lengthwise between an inboard end and an outboard end, the inboard end being coupled to the inboard support member and the outboard end being coupled to the outboard support member, the non-rotating planetary carrier being configured to support a plurality of planetary gears between the inboard and outboard ends, wherein, when rotational motion is being transmitted through the planetary gears to rotationally drive the drive wheel about a rotational axis of the drive wheel, the non-rotating planetary carrier remains fixed relative to the planetary gears.

12. The axle support assembly of claim 11, further comprising an input shaft extending at least partially within the planetary carrier and a sun gear coupled to the input shaft for rotation therewith, the sun gear being supported by the planetary carrier for rotation relative to the planetary carrier about the rotational axis of the drive wheel, the sun gear being configured to rotationally drive the planetary gears.

13. The axle support assembly of claim 11, further comprising a gear housing rigidly coupled to the inboard support member, the gear housing defining at least one attachment feature configured to allow the gear housing to be pivotally coupled directly to the axle body.

14. The axle support assembly of claim 13, wherein a gear cavity is defined between the gear housing and the inboard support member that houses vertically offset drive gears, the vertically offset drive gears providing an offset configuration such that a rotational axis of an axle shaft of the steerable drive axle is vertically offset from the rotational axis of the drive wheel.

15. The axle support assembly of claim 11, wherein the inboard support member defines at least one attachment feature configured to allow the inboard support member to be pivotally coupled directly to the the axle body.

16. The axle support assembly of claim 11, wherein each of the first and second support arms including an inboard arm portion configured to extend outwardly from the support body along the inboard side of the drive wheel and an extension arm position configured to extend axially from the inboard portion along an outer perimeter of the drive wheel towards the outboard side of the drive wheel.

17. The axle support assembly of claim 16, wherein an end of the extension arm portion of each of the first and support arms is coupled to the outboard support member.

18. The axle support assembly of claim 11, wherein the track assembly further comprises an undercarriage support beam configured to support a plurality of non-drive wheels of the track assembly, the inboard support member being configured to be coupled to the undercarriage support beam along the inboard side of the drive wheel and the outboard support member being configured to be coupled to the undercarriage support member along the outboard side of the drive wheel.

* * * * *